United States Patent

Tompkins et al.

[11] Patent Number: 5,932,091
[45] Date of Patent: Aug. 3, 1999

[54] OILY WASTE WATER TREATMENT SYSTEM

[75] Inventors: Kevin Todd Tompkins, University Park, Md.; Jerome S. Stefanko, Washington, D.C.; Brian L. Owsenek, Burtonsville, Md.; Lawrence W. Tomlinson, Pasadena, Md.; Joseph A. Gavin, Glen Burnie, Md.

[73] Assignee: The United States of America as represented by the Secretary of the Navy, Washington, D.C.

[21] Appl. No.: 09/012,016

[22] Filed: Jan. 22, 1998

[51] Int. Cl.⁶ .............................. B01D 61/22; B01D 61/20
[52] U.S. Cl. .................. 210/97; 210/137; 210/195.2; 210/258; 210/259; 210/321.69; 210/804
[58] Field of Search .................... 210/96.1, 96.2, 210/257.1, 257.2, 258, 259, 195.1, 195.2, 321.69, 799, 804, 805, 806, 97, 137, 321.65, 651

[56] References Cited

U.S. PATENT DOCUMENTS

| | | |
|---|---|---|
| 5,227,071 | 7/1993 | Torline et al. .......................... 210/804 |
| 5,286,379 | 2/1994 | Jackson . |
| 5,350,527 | 9/1994 | Kitko . |
| 5,388,542 | 2/1995 | Fischer et al. .......................... 210/804 |
| 5,423,340 | 6/1995 | Campbell et al. . |
| 5,439,592 | 8/1995 | Belloset et al. . |
| 5,439,601 | 8/1995 | Burkland et al. . |
| 5,449,469 | 9/1995 | Burkland et al. . |
| 5,460,723 | 10/1995 | Bourbigot et al. . |
| 5,538,641 | 7/1996 | Getty et al. . |
| 5,679,258 | 10/1997 | Petersen .................................. 210/804 |
| 5,800,720 | 9/1998 | Wehrle et al. .......................... 210/799 |

*Primary Examiner*—Joseph W. Drodge
*Attorney, Agent, or Firm*—John Forrest; Jacob Shuster

[57] ABSTRACT

The effluent outflow from a shipboard oil/water separator is further reduced in oil content by passage through ultrafiltration membranes arranged in series as an added downstream treatment prior to overboard discharge. Effluent from the oil/water separator is buffered by delivery through a feed pump and use of a recirculation pump through which such downstream ultrafiltration treatment is subject to conditional flow control as well as periodic backflush cleansing of the filter membranes.

10 Claims, 4 Drawing Sheets

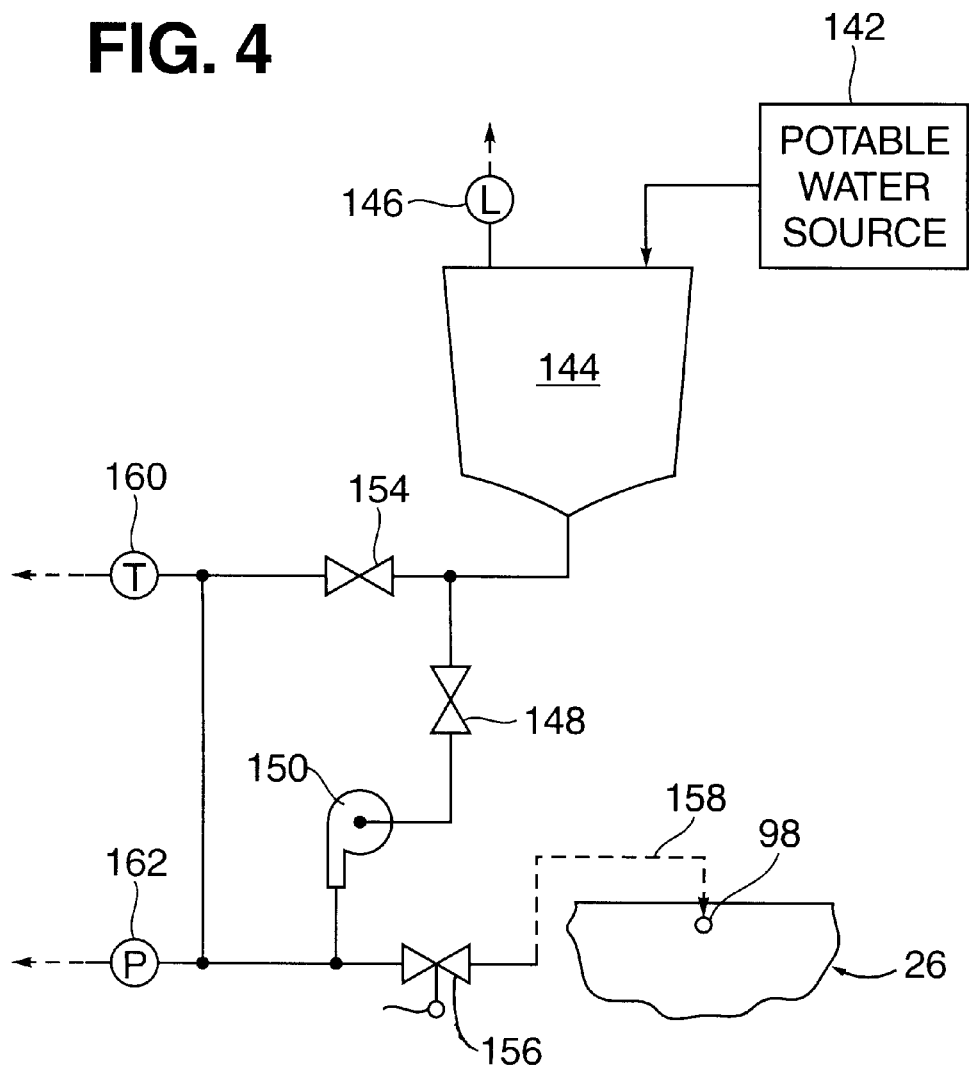

OILY WASTE WATER TREATMENT SYSTEM

The present invention relates in general to filtration of an effluent from a non-chemical type of oil/water separator for further reduction in oil concentration of oily wastewater in the cleansed discharge from such separator.

BACKGROUND OF THE INVENTION

Currently, oily wastewater collected in a shipboard holding tank is processed within a non-chemical, parallel-plate type of oil/water separator for removal of oil from such wastewater prior to its overboard discharge. Such processing of oily wastewater has recently become less effective because of the presence of detergents in the wastewater. Also, more stringent requirements of environmental regulations often exceed the oil reducing capabilities of the aforesaid non-chemical type of wastewater processing systems. It is therefore an important object of the present invention to provide for increased reduction in oil content of the non-chemically processed oily wastewater, despite contamination thereof and without excessive space-occupying equipment, which is of particular concern for shipboard installations.

SUMMARY OF THE INVENTION

Oily waste bilge water withdrawn from a holding tank and processed by an oil/water separator into an effluent having a reduced oil content, is further processed in accordance with the present invention by treatment within series connected membrane filtration units for overboard discharge of a substantially oil-cleansed permeate. The effluent from the oil/water separator is discharged into a feed tank for delivery to downstream filtration units via a feed pump. The feed tank level is controlled by a continuous level sensor in the feed tank and a permeate control valve in the piping downstream of ceramic membranes forming an ultrafiltration system and interconnecting electronics. A recirculation pump induces axial flow through the membranes to reduce contaminant build-up. By use of an automatic bleed valve associated with permeate and bleed flow sensors, a high ratio of feed to waste volumes is attained. To prevent membrane fouling while the ultrafiltration system and recirculation pump are idle, an automatic valve is provided to backflush the membranes with potable water and rinse out accumulated oil and debris. Diluted oil and debris is routed by an automatic drain valve to an oily waste holding tank for future reprocessing. Pressure, flow-rate and temperature gauges as well as sampling valves provide means for monitoring operation and collecting data necessary to enable the exercise of manual and/or automatic control through selector and actuated valves to obtain proper coordinated system operations, including timely operation of the aforementioned feed, recirculation and flush pumps.

Effluent from the oil/water separator is buffered by use of a small feed tank, active level sensors and control valve to allow installation of downstream filtration membrane units without need for electrical interconnection with the oil/water separator. Automatic draining of the feed tank each operational cycle returns overflow to the holding tank. The filtration membranes are mounted in vertical relation to each other to limit exposure to floating oil. Provisions are also made for periodically timed removal of concentrated waste fed to a disposal tank.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein:

FIG. 1 is a block diagram of a shipboard system for disposal of bilge waste in accordance with one embodiment of the invention; and FIGS. 2, 3 and 4 are flow circuit diagrams showing in greater detail different portions of the system depicted in FIG. 1.

DETAILED DESCRIPTION OF PREFERRED EMBODIMENT

Figure 1:
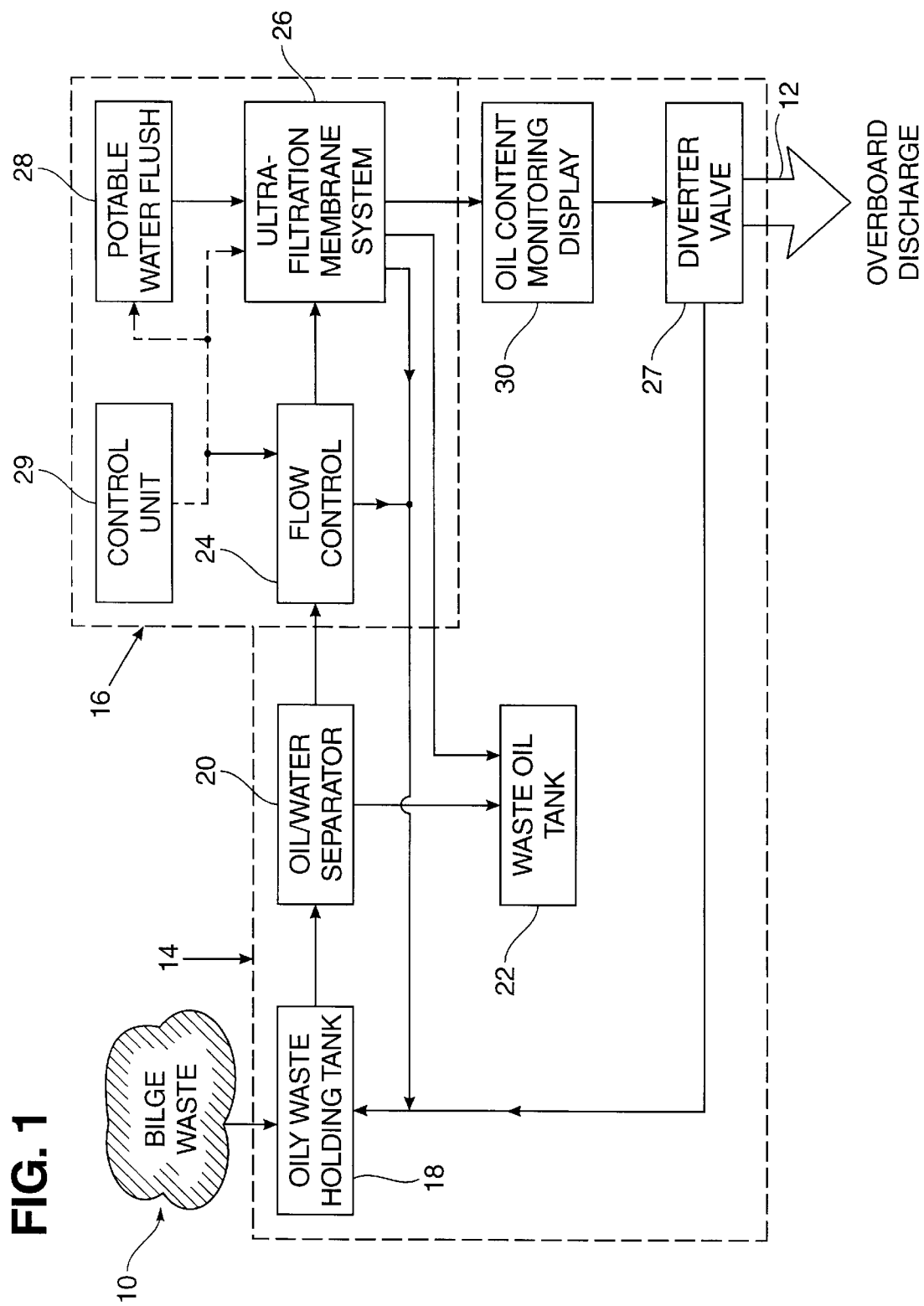

Referring now to the drawing in detail, FIG. 1 diagrams a shipboard system for processing oily wastewater, such as a source 10 of bilge waste, in order to provide an overboard discharge 12 having a reduced oil content. Reference numeral 14 in FIG. 1 generally denotes a section of the waste water processing system which corresponds to one being currently utilized on seagoing vessels of the U.S. Navy. In accordance with the present invention such waste water processing section 14 is associated with and modified by an ultra-filtration section 16.

With continued reference to FIG. 1, the oily waste from bilge 10 is received within a holding tank 18 in section 14 of the system from which it is delivered to a generally well known, parallel plate type of oil/water separator 20. Bulk oil thereby initially separated from the oily wastewater in accordance with prior art processing is fed to a waste oil tank 22 in section 14, while the oil reduced effluent from the separator 20 is delivered to the filtration section 16 for further reduction in oil content before disposal by return to the seawater through overboard discharge 12. Flow of the effluent from separator 20 is routed and regulated for further processing through flow control 24 of section 16 so as to direct such effluent for ultrafiltration treatment in membrane system 26 within section 16. Outflowing permeate from the ultrafiltration membrane treatment system 26 is continuously monitored for oil content through display 30 during recirculation by diverter valve 27 to the holding tank 18 to which the permeate is diverted in the event high oil levels is sensed therein. Flow regulation through flow control 24 is controlled by a control unit 29, as diagrammed in FIG. 1, which also controls operation of a potable water flush 28 for the membrane system 26 to which the flow control 24 is connected for supply of effluent thereto.

Figure 2:
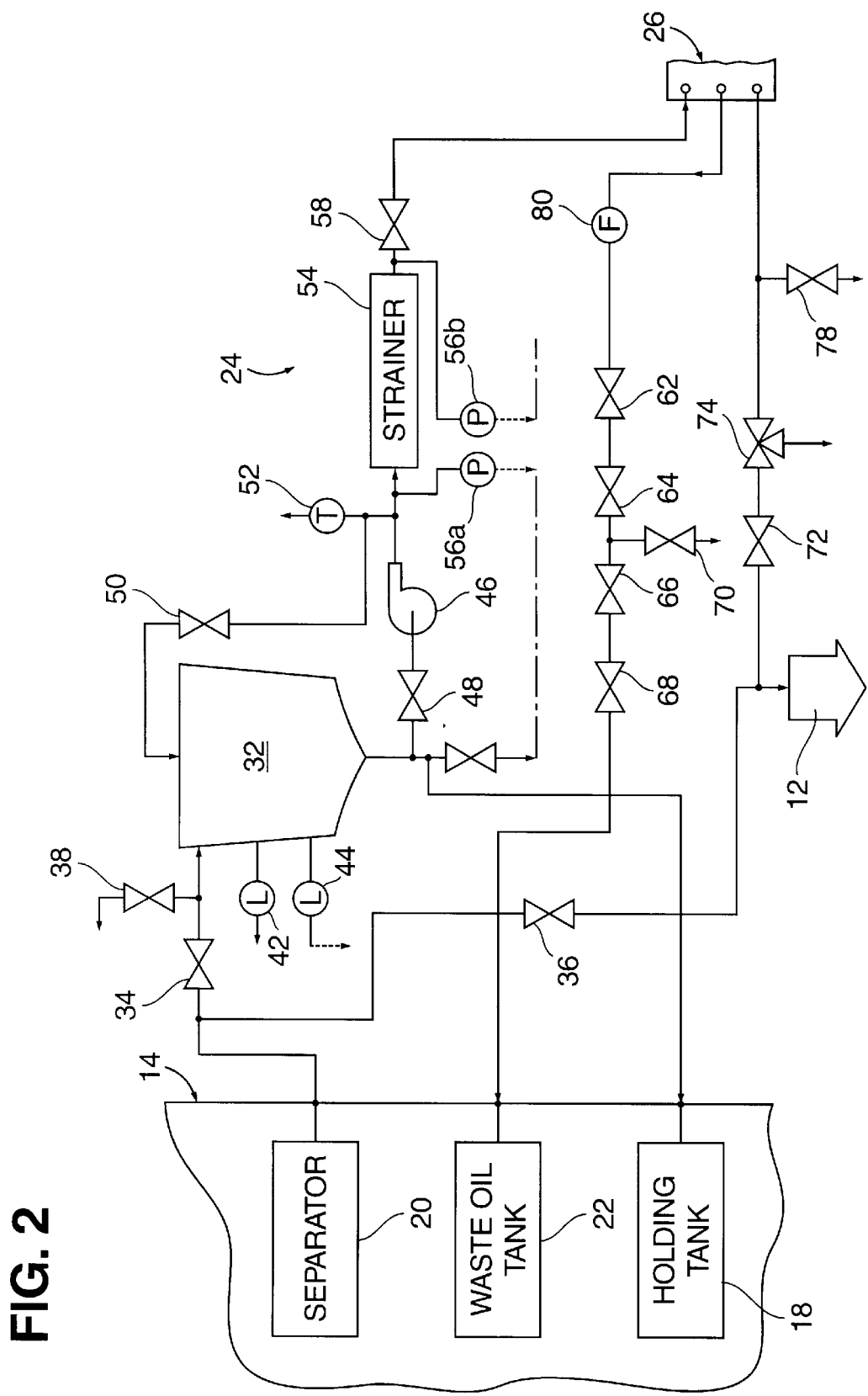

Referring now to FIG. 2 diagramming the flow control 24, a buffer feed tank 32 receives effluent from the separator 20 of section 14 under control of a supply valve 34. The effluent may also be diverted through selector valve 36 directly to the overboard discharge 12 and sampled through valve 38. Overflow of the oily waste holding tank 18 is indicated by level sensor 42, while sensor 44 provides a continuous level indication. Outflow of the effluent from the feed tank 32 is induced by a feed pump 46 through isolation valve 48. A by-pass valve 50 controls return of effluent from pump 46 to tank 32 for protection of the pump from overheating. A temperature gauge 52 is also connected to the outflow side of the feed pump 46 for monitoring the temperature of the effluent before it flows into a duplex type of strainer 54. Pressure gauges 56a and 56b monitor effluent pressures entering and leaving such strainer. The effluent outflow from the strainer is then supplied to the ultrafiltration treatment system 26 through an isolation valve 58.

Outflow of oil concentrate separated from the effluent during treatment in system 26 is conducted through a magnetic type flow gauge 60 in series with sampling and bleed valves 62 and 64, to an actuated bleed control valve 66 from which the oil concentrate is supplied by outflow valve 68 to the waste oil tank 22 in section 14. A sampling valve 70 is connected between valves 64 and 66. In addition to effluent from section 14 being fed to the overboard discharge 12 through valve 38, selector valve 72 and control valve 74 supply the filtration processed permeate from the ultrafiltration treatment system 26 to the overboard discharge 12 as diagrammed in FIG. 2. Sampling of the latter delivery of effluent from control valve 74 may be effected through valve 76.

Figure 3:
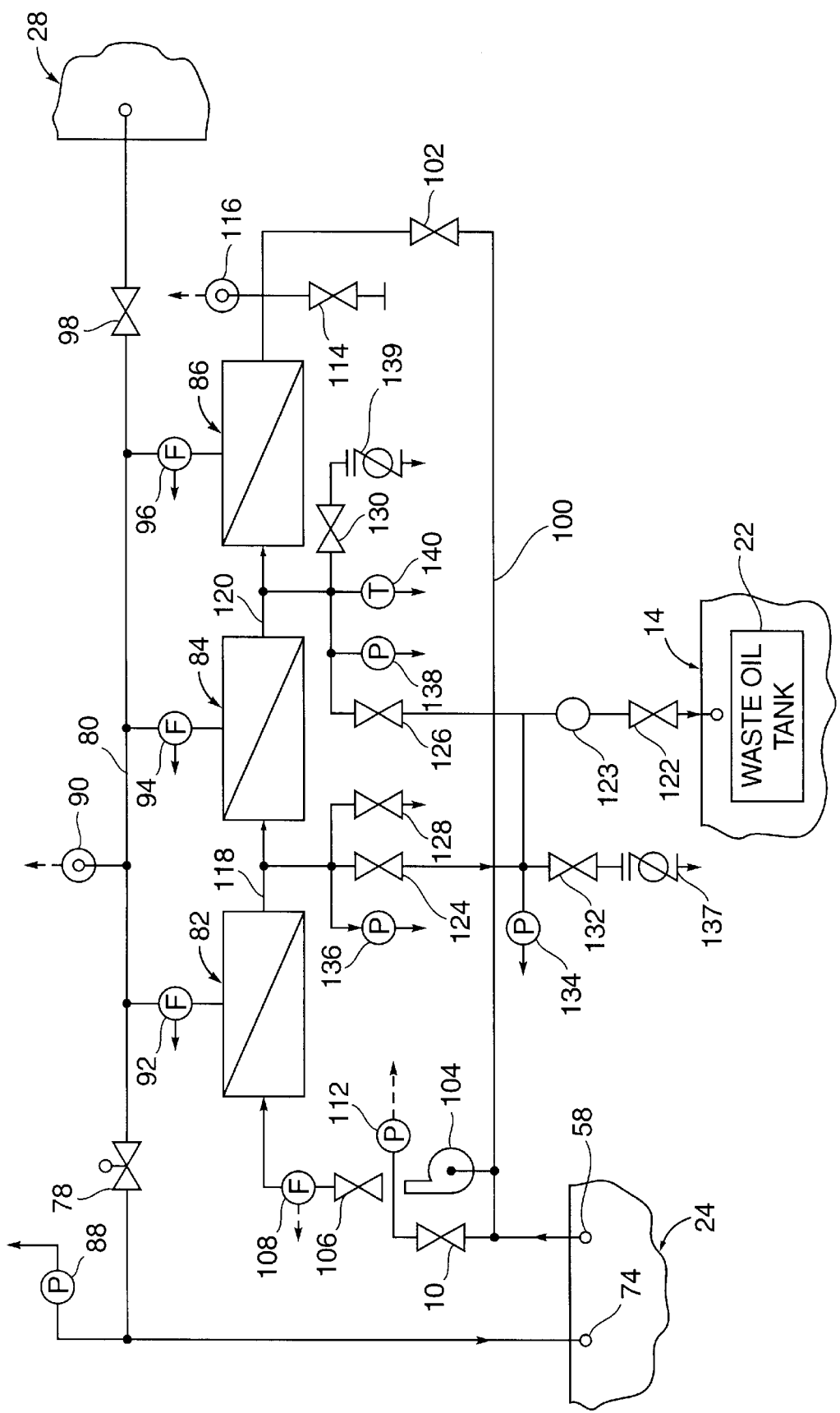

As diagrammed in FIG. 3, filtration processed permeate from the ultrafiltration treatment system 26 is delivered to the control valve 74 of flow control 24 through a valve 78 from three series connected, ceramic membrane type of filtration units 82, 84 and 86 through a conduit 80. The flow rate and pressure of the permeate in conduit 80 is monitored through flow rate and pressure gauges 88 and 90 while the flow rate of effluent outflow from each of the three filtration units are respectively monitored by flow rate gauges 92, 94 and 96. The conduit 80 is also connected by a backflush valve 98 to the water flush 28. Also, an oil cleansed permeate is delivered by the filtration unit 86 to the downstream end of a recirculation loop 100 through an isolation valve 102. The upstream end of loop 100 is connected to a recirculation pump 104, the output of which is connected by an isolation valve 106 to the inlet of filtration unit 82 through a flow rate monitoring gauge 108. Inflow of effluent from separator 20 received from isolation valve 58 of the flow control 24 is conducted in series through the filtration units under pressure of the feed pump 46 and the recirculation pump 104. A by-pass valve 110 is provided to prevent overheating of the recirculation pump 104. The pressures of inflow to the filtration unit 82 is monitored by pressure gauge 112 at the upstream end of the recirculation loop, while the downstream end connected to a drain valve 114 is monitored for pressure by a gauge 116. The effluent treated in system 26 is delivered to the waste oil tank 22 through a bleed valve 122 in series with an upstream magnetic flowmeter 123.

As result of the foregoing described arrangement, oil concentrate outflow from conduit 118 or 120 interconnecting the filtration units 82, 84 and 86 is fed to the waste oil tank 22 in section 14 during timed cycles through actuated bleed valve 122, which remains open during each bleed cycle until the desired volume reduction ratio is achieved as calculated from flowmeters 123 and 88. Drain valves 128 and 130 are also respectively connected to the outflow conduits 118 and 120, while a drain valve 132 is connected to the outlet sides of the selector valves 124 and 126 together with a pressure monitoring gauge 134. The outlets of the drain valves 128 and 130 are connected to air eliminators 137 and 139. The pressure of the oil concentrate in conduit 118 is monitored by gauge 136, while pressure and temperature of the concentrate in conduit 120 is monitored by gauges 138 and 140. By such monitoring of pressures, flow rates and temperatures through the gauges 90, 92, 94, 96, 108, 112, 116, 134, 136, 138 and 140 as hereinbefore described, data is supplied to the monitor display 30 through which control over the system is exercised by the selector and control valves hereinbefore described.

As hereinbefore indicated, the membrane filtration units 82, 84 and 86 may also be supplied through conduit 80 with cleansing water from the water flush 28 through backflush valve 98. As diagrammed in FIG. 4, the water flush 28 includes a potable water source 142 from which a backflush tank 144 is filled to a desired level as detected by level sensor 146. Water from tank 144 is fed through isolation valve 148 to the inlet of a backflush pump 150 having a drain valve 152 connected thereto. The outlet of tank 144 also has a pump by-pass valve 154 through which water from the tank is directly fed to actuated control valve 156 to which the outlet of pump 150 is connected. The control valve 156 is selectively actuated to regulate supply of water from tank 144 through a hose 158 to the aforementioned filter backflush valve 98 in the ultrafiltration treatment system 26. The temperature and pressure of the backflush water supplied to the control valve 156 from tank 144 is monitored through temperature and pressure gauges 160 and 162. The flush tank 144 may also be filled with permeate during operation of the membrane system 26 by opening of valve 156 until the tank level indicator 146 indicates a predetermined high level.

Each of the filtration units 82, 84 and 86 hereinbefore described is of the silica-coated ceramic membrane type through which effluent from the oil/water separator 20 may be processed under control of valve 34 through which the flow rate of the effluent supplied to feed tank 32, thereby interfaced with the membrane treatment system 26, is adjusted in accordance with feedback from the level sensors 42 and 44 for the feed tank 32 so as to match the effluent outflow from the separator 20 with flow through the membrane treatment system 26. Any excess flow of effluent from separator 20 drains through an overflow line 160 from feed tank 32 as shown in FIG. 2, under normal operation when the membranes of system 26 have fouled beyond the point at which separator output can be matched. The supply of effluent from the feed tank 32 to the membrane treatment system 26 at the matching flow rate is enabled by feed pump 46. The filtration membranes of units 82, 84 and 86 are furthermore backflushed between effluent processing cycles by supply of potable water or permeate thereto under pressure of pump 150 from flush tank 144. Oil concentrate is removed from the filtration units 82, 84 and 86 through the selector bleed valves 124 and 126 during timed cycles for disposal by supply to the oily waste holding tank 18 by passage through the backflush valve 122, thereby maximizing the cleansing of the further processed effluent that is fed from filtration treatment system 26 through valves 78, 74 and 72 to the overboard discharge 12.

The flow rate, pressure and temperature gauges disposed throughout the system as hereinbefore described allow measurement for evaluation of system performance while the sampling valves allow collection of oily waste separated effluent, filtration permeates and oil concentrates in connection with said evaluation of system performance and prevention of improper performance by operational modification through the selector valves. For example, during normal operation the feed tank 32 monitored through sensors 42 and 44 is maintained at a preset level by feedback control of the filtration permeate valve 78, while the outflow of oil concentrate is fed to the waste oil tank 22 at a flow rate monitored by gauge 60. Such outflow may be automatically enabled through the bleed valve 66 in order to maintain a desired oil concentration factor. During manual operation of the system, the ultrafiltration treatment within system 26 in section 16 is performed simultaneously with operation of section 14 and in coordination therewith to maintain flow rate matching of inflow to and outflow from the filtration treatment system 26 as aforementioned. Cyclic operation may be automatically started by operation of feed pump 46 when the level sensor 40 detects rise in the volume of effluent in the feed tank 32 above a preset limit, while detection of a drop in effluent volume in feed tank 32 below a lower limit by level sensor 44 shuts down the pump 46.

Such cyclic operation may continue until overruled by operator intervention.

The system as hereinbefore described is equipped with interlocks and time delays to prevent improper operation. Thus, simultaneous operation of the flush pump 150 and the feed pump 46 is prevented. Recirculation pump 104 starts after feed pump 46 following a time delay. Only during powered operation, the bleed valve 66 and flush valve 122 cycle open and closed. Opening of flush valve 122 occurs however only if the feed pump 46 is off or following a time delay after start up of the flush pump 150. The flush tank valve 156 will be opened either while the feed pump 46 is off or following a time delay after start up of the flush pump 150.

Obviously, other modifications and variations of the present invention may be possible in light of the foregoing teachings. It is therefore to be understood that within the scope of the appended claims the invention may be practiced otherwise than as specifically described.

What is claimed is:

1. In combination with non-chemical separator means through which oily wastewater is processed for extraction of an oil concentrate portion therefrom and discharge of an oil reduced effluent, a system for further reducing oil concentration within said effluent, comprising: a plurality of filtration units; flow buffering means operatively connecting the separator means to one of the filtration units for delivery of said effluent thereto under a limited range of conditions; flow control means interconnecting said filtration units in series for establishing a recirculation loop therethrough through which the effluent when delivered from the buffering means to said one of the filtration units undergoes sequential processing within the filtration units; outflow means connected in parallel to each of said filtration units for selective control of said discharge of the oil reduced effluent separated from the oil concentrate portion; and oily waste collecting means connected to the recirculation loop between said filtration units for removal of the oil concentrate portion of the oil-reduced effluent during said discharge theroeof.

2. The system as defined in claim 1 wherein each of said filtration units is formed by an ultrafiltration membrane.

3. The system as defined in claim 2 including a recirculation pump through which the effluent is pressurized while undergoing said sequential processing within the recirculation loop.

4. The system as defined in claim 3 wherein said flow buffering means includes: a feed tank operatively connected to the separator means within which the effluent is stored; and feed pump means connected to the feed tank for pressurizing the stored effluent during said delivery thereof from the feed tank under the limited range of conditions to said one of the filtration units.

5. The system as defined in claim 4 including flush means connected to the outflow means for supply of cleansing fluid to each of the filtration units during intervals between said discharge therefrom.

6. The system as defined in claim 5 wherein said flush means includes a source of potable water and selectively controlled pump means for supply of said potable water to the outflow means as the cleansing fluid during said intervals between the discharge from the filtration units.

7. The system as defined in claim 1 including flush means connected to the outflow means for supply of cleansing fluid to each of the filtration units during intervals between said discharge therefrom.

8. The system as defined in claim 7 wherein said flush means includes a source of potable water and selectively controlled pump means for supply of said potable water to the outflow means as the cleansing fluid during said intervals between the discharge of the reduced oil portion of the effluent.

9. The system as defined in claim 1 including a recirculation pump through which the delivered effluent is pressurized while undergoing said sequential processing.

10. The system as defined in claim 1 wherein said flow buffering means includes: a feed tank operatively connected to the separator means within which the effluent is stored; and feed pump means connected to the feed tank for pressurizing the stored effluent during said delivery thereof from the feed tank under the limited range of conditions to said one of the filtration units.

* * * * *